Feb. 21, 1967 V. E. HAMILTON 3,305,422
METHOD AND MEANS FOR MAKING AMBIENT LIGHT FILTER
Filed June 17, 1963 2 Sheets-Sheet 1
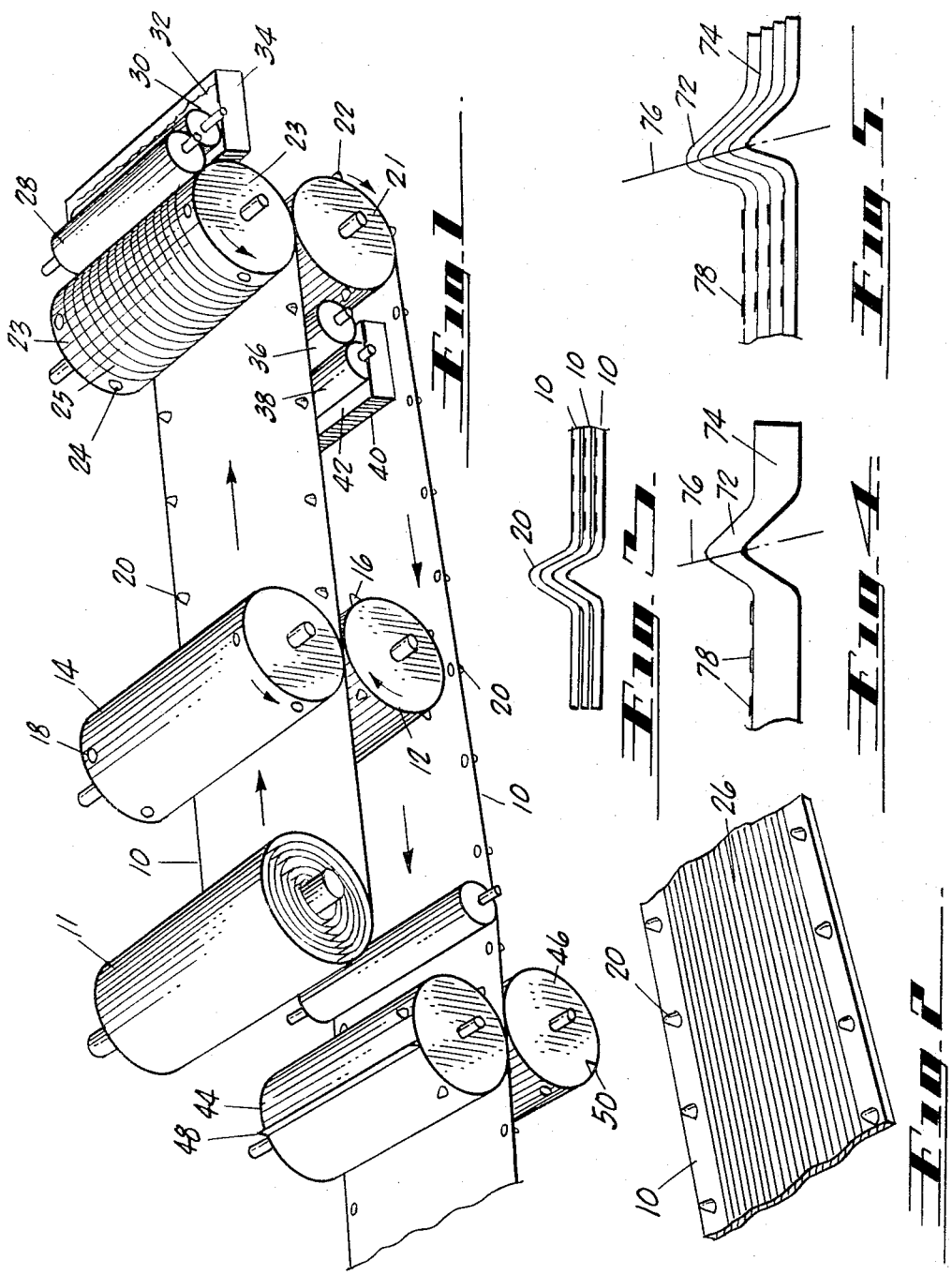
INVENTOR.
VERN E. HAMILTON
BY
Edwin Coates
- ATTORNEY -

Feb. 21, 1967  V. E. HAMILTON  3,305,422
METHOD AND MEANS FOR MAKING AMBIENT LIGHT FILTER
Filed June 17, 1963  2 Sheets-Sheet 2
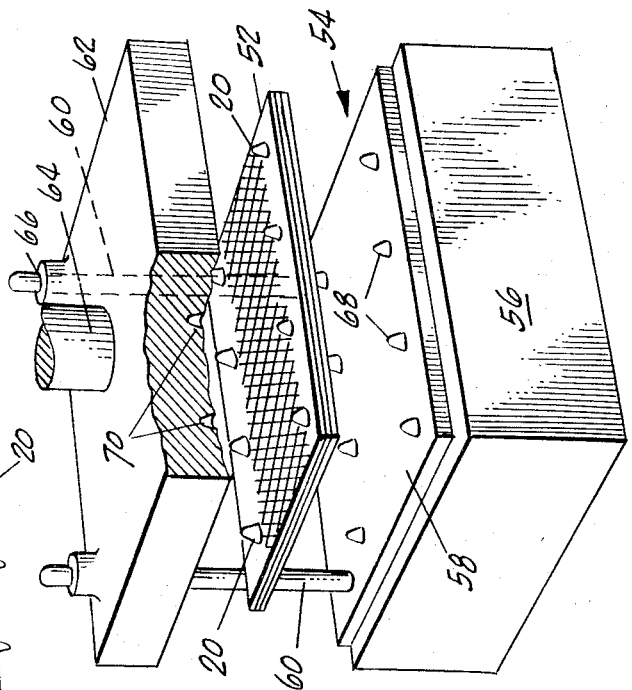
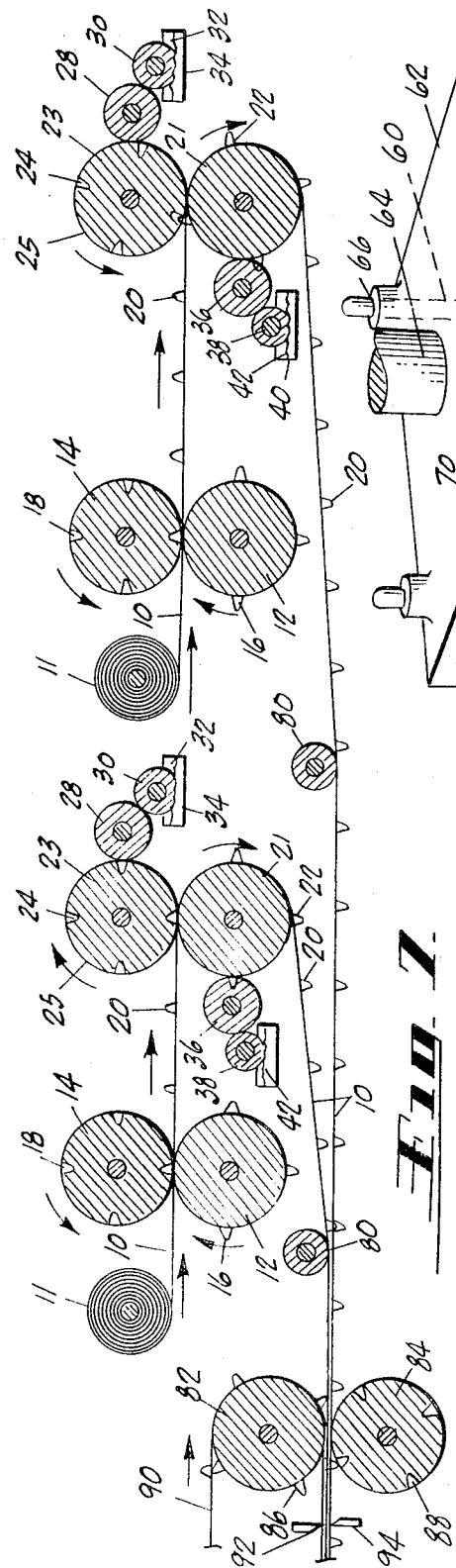
INVENTOR.
VERN E. HAMILTON
BY
Edwin Coates
ATTORNEY

United States Patent Office 3,305,422
Patented Feb. 21, 1967

3,305,422
METHOD AND MEANS FOR MAKING
AMBIENT LIGHT FILTER
Vern E. Hamilton, Palos Verdes Estates, Calif., assignor to Douglas Aircraft Company, Inc., Santa Monica, Calif.
Filed June 17, 1963, Ser. No. 288,106
21 Claims. (Cl. 156—254)

This invention relates to the production of space-lattice type ambient light trapping filters and more particularly to apparatus and methods for producing components of such filters and laminating the components into completed articles on a production basis.

Cathode ray tubes are typical examples of diffuse radiant screens and are particularly susceptible to the effects of ambient light rays. When such rays strike the surface of a cathode ray tube at various angles they produce specular reflection off the glass or diffuse reflection off the phosphors or both. The more serious problem is the reflection off the phosphors because such reflection often illuminates the low lights to such extent as to confuse them with the highlights, thus degrading the contrast.

Various schemes have been proposed for overcoming this difficulty, such as hoods over the tubes and honeycomb cores located in front of the "screens," but such schemes have met with only minor success. My copending application for patent on Ambient Light Filter, Serial No. 230,644, filed October 15, 1962, discloses a novel construction which solves the problem.

Briefly, that novel construction comprises a filter body of transparent material in which are embedded a plurality of filter elements having a grid pattern. Each element constitutes a tier of alternating transparent and highly light absorbing material in closely spaced relation to constitute a multiplicity of light transmitting apertures bordered by such light absorbing material. The grid pattern may be formed of generally parallel straight or wavy lines, or lines crossing each other to produce cells of varying shapes including but not limited to squares, rectangles and diamonds. The tiers are in generally parallel relation to each other and are spaced depthwise of the filter body with the light transmitting apertures in registry to constitute depthwise directed viewing cells. Thhe axes of the cells may be normal to the plane of the filter body or at some other preselected angle.

Ambient light rays striking the surface of the filter body at acute angles other than normal are refracted into the cells at an angle, striking one or another of the depthwise spaced lines of light absorbing material and are absorbed thereby. The success of such filter results from the fact that the cells are very small in at least one lateral dimension and the lines forming the cell boundaries are extremely thin in the depthwise direction so that their edges present no appreciable grazing surface to reflect light rays onwardly. In fact, in a typical example the width of the apertures may be from .015 to .020 inch and the line width from .002 to .004 inch. The line thickness may vary from .0001 to .0002 inch, or even thinner, and the depthwise spacing between lines may be of the order of .010 inch or less. Such a filter with six filter elements is only one sixteenth inch thick.

It will be readily appreciated that the manufacture of a filter of this type presents a very difficult problem, particularly with respect to the registry of the apertures in the several tiers. The separate layers bearing the filter elements, as disclosed in the prior application, must be very finely adjusted and then held in adjusted position until they are firmly cemented.

These problems are greatly simplified by the use of the present invention which provides a means and method for relatively high speed production of such filters having collimated viewing cells directed substantially normal to the plane of the filter. A slight modification of the apparatus makes it possible to produce filter bodies in which the axes of the viewing cells are directed at a substantial angle to the normal.

The base material used in the practice of the invention is an elongate continuous web of transparent plastic material of any desired thickness, depending on the specific design of the filter, usually of the order of .010 inch or less. Suitable materials are cellulose acetate and ethyl cellulose. Other materials having suitable transparency and flexibility may be substituted. The end product is a laminate of two or more sheets of this material severed from the web and permanently laminated to each other with a suitable transparent cement, each layer or sheet having an identical grid pattern thereon and the patterns being in predetermined depthwise registry to produce depthwise directed viewing cells.

In general, the method comprises feeding or translating a continuous web of the material mentioned above in a longitudinal direction and forming a series of longitudinally spaced dimples in the web, preferably along one or both margins. These dimples are protuberances produced by deforming local areas of the web out of the plane of the web, resulting in recesses in the opposite face. Usually the spacing is uniform although for special purposes it may be non-uniform. It has been determined that a generally conical shape with a rounded tip or apex is quite satisfactory though not mandatory.

The desired grid pattern is imprinted on one face of the web and a coating of cement is applied to the other face. The web is severed into pieces or sheets of the desired length and the appropriate number of these pieces or sheets are arranged in laminar relation. At this point the dimples come into play. The sheets are adjusted until the dimples of each sheet are nested with the dimples of the adjacent sheet. This adjustment results in the proper registry of the grid patterns of the various layers. The engagement of the dimples now prevents lateral slippage of the sheets with respect to each other, and depthwise directed pressure is applied to the lamination to unite it into a completed filter body.

One preferred form of apparatus for making the filters includes a first pair of drive rolls which engage the opposed faces of the web and feed or translate it longitudinally. At each end of each drive roll are annular forming portions, those on one roll being provided with uniformly peripherally spaced protuberances and those on the other roll being provided with matching recesses. These forming portions engage the margins of the web and deform it locally to produce a series of uniformly longitudinally spaced dimples. This operation may be facilitated by heating the, forming portions or even the entire rolls.

The web now travels to a second set of drive rolls having similar portions at their ends to engage and drive the web in chain and sprocket fashion. The web passes around the first of these rolls and susbtantially reverses its direction of travel to ensure good driving engagement with the roll. The second roll carries printing formations in the desired grid pattern and is continually coated with printing fluid by a transfer roll supplied by a conventional source of fluid.

The first roll may be dry or be coated with suitable cement from a conventional source for transfer to the face of the web opposite the imprinted side. The web now travels on to a severing station where it is divided into sheets of the desired length. A quantity of sheets sufficient to make up a filter is now stacked up with the dimples of each sheet nested with the dimples of the adjacent sheet to prevent lateral slippage, and placed in a press where they are squeezed tightly together to eliminate any air between sheets. If the first drive roll was dry, the cement is applied to the sheets during the stacking operation. Since the dimples eliminate any necessity for guide pins and guide holes through the sheets there is no path for excess cement to work down onto the base plate of the press where it can cause sticking of the laminate to the base plate.

The first roll can apply wet cement to the web which causes some difficulty and inconvenience at the shear or other severing device although the problem is not serious. The first roll can also apply a heat softening cement, in which case the supply tank, intermediate rollers, and the first roll are heated. In this case the cement dries by cooling on the way to the severing station. The laminating press is then operated hot to soften the cement sufficiently to cause it to bond while under pressure. In some cases it is also desirable to heat the printing roll so that the printing fluid will dry during the further travel of the web.

A modification of the apparatus described above consists in eliminating the first set of drive rolls and using the forming portions of the printing and cementing rolls to impress the dimples in the web.

A further modification consists in duplicating the forming, printing, and cementing portions of the apparatus described above, one or more times. The individual webs are then fed to a common location where the dimples of the different webs are interengaged to properly register the grid patterns. The laminated webs are then passed between a pair of pressure rolls where they are permanently bonded together. If heat softening cement has been used the pressure rolls are heated to accomplish the bonding. The laminations are sheared to length after the bonding operation.

When the axes of the dimple cones are normal to the plane of the web or sheet, the viewing cells formed in the laminate will also be normal to the plane. If it is desired to divert the viewing cell axes from normal the dimple cones are formed with their axes tilted to a predetermined extent. As the sheets are stacked up, each sheet is displaced laterally from the adjacent sheet by a very small predetermined amount and when the sheets are bonded together the grid patterns will be seriately displaced to form viewing cells having a corresponding divergence from the normal to the plane of the laminate.

Various other advantages and features of novelty will become apparent as the description proceeds in conjunction with the accompanying drawings, in which:

FIG. 1 is an idealized representation, in perspective, of a basic apparatus for carrying out the invention;

FIG. 2 is a fragmentary perspective view of a portion of the web which has been dimpled and imprinted;

FIG. 3 is a fragmentary view, in section, of a lamination of filter element sheets showing the nesting of the dimples;

FIG. 4 is a fragmentary view, in section, of a portion of a web which has been imprinted with a grid pattern and impressed with an off-normal dimple;

FIG. 5 is a fragmentary view, in section, of a lamination made up with sheets from the web of FIG. 4, showing the lateral displacement of the sheets;

FIG. 6 is a fragmentary perspective view of the laminating press used with the apparatus of FIG. 1; and FIG. 7 is a schematic elevational view of a modified form of the apparatus.

In one form of the practice of the invention a continuous web of thin, flexible, transparent, plastic material 10 is fed from a supply roll 11 between a pair of drive rolls 12 and 14 which rotate in opposite directions as shown and frictionally grip the web to translate it longitudinally onward to the right as viewed in FIG. 1. At each end of each of the rolls is a forming portion. As shown, roll 12 is provided with uniformly peripherally spaced male dimple projections or protuberances 16 and roll 14 is provided with matching female dimple recesses 18. The projections deform local areas of the margins of the web out of its plane into the recesses in roll 14 to produce the series of dimples 20. The preferred form is as shown although the dimples may be formed in one margin only or even along loci well inward from the margins if desired. In some cases the spacing may be made non-uniform.

It has been determined that every satisfactory results may be obtained with the dimples in the form of cones with rounded tips, although other shapes will work reasonably well. The dimples may be formed cold in many materials although greater accuracy and permanency result from hot forming. To this end, the forming portions of rolls 12 and 14 are provided with electrical heating means of known type, not shown, and the entire rolls may be heated if desired. It is possible to form the dimples in the raw stock at or after the time of manufacture although it poses somewhat of a packaging problem.

After leaving the first pair of drive rolls the web, with dimples 20 fully formed and uniformly spaced along its margins, passes between a second set of drive rolls 21 and 23 and is wrapped around roll 21 for a distance approximately 180 degrees for better driving engagement. Rolls 21 and 23 are provided with protuberances 22 and recesses 24 respectively which engage the dimples in sprocket and chain fashion and insure accurate, controlled movement.

Roll 21 should be quite large compared to the size of the dimples so that the curvature of the web as it wraps around roll 21 will have a minimum tendency to distort the dimples and affect their accuracy.

Roll 23 is provided with printing formations 25 corresponding to the grid pattern which it is desired to imprint on the web. In this instance they are in the form of annular ridges to produce a parallel straight line grid 26 as shown on web 10 in FIG. 2. It will be seen that the grid pattern is substantially narrower than the distance between the lines of dimples. After assembly the web margins are severed and scrapped. Any desired grid pattern may be substituted for the one shown. The printing formations are provided with printing fluid by transfer rolls 28 and 30 from a supply 32 in container 34, all in a conventional manner.

Roll 21 has a smooth cylindrical surface except for protuberances 22 and hence is quite suitable for applying cement to the rear face of the web, that is, the face opposite the printed face. For this purpose it is contacted by roll 36 which receives cement from transfer roll 38, which in turn picks up cement 42 from container 40 in conventional fashion. Roll 36 is shorter than roll 21, and in fact is of such length as to produce a cement coating on the web which is of substantially the same width as grid pattern 26. This represents the amount of the web which will remain in the final laminated filter body.

Material 42 may be a conventional wet cement such as Canada balsam, or catalytic setting cement which will dry or set up slowly in place in the laminate. If desired, a heat softening cement may be used. In this case the container 40 and cement 42 will be heated, and also rolls 38, 36, and 21. The cement will then dry by cooling before reaching the severing station so that the laminate is laid up dry and placed in a hot press where the cement will soften to form a bond. Roll 21 can of course be operated dry and the cement applied to the sheets as they are stacked into a laminate. Printing roll 23 may also be heated to promote drying of the grid lines as the web proceeds to the severing station. All of the heating means used for the above purposes are conventional and it is deemed unnecessary to illustrate or further describe them.

It is possible in some cases to eliminate the drive and forming rolls 12 and 14 and feed the web directly from the supply to rolls 21 and 23, where their protuberances and recesses 22 and 24 will form the dimples at the same time that the web is printed and cemented.

After leaving roll 21 the web travels to a severing station. Any type of shear may be used and a simple conventional rotary shear is shown in FIG. 1. It comprises upper and lower rolls 44 and 46. The upper roll carries a projecting knife 48 extending the full length of the roll and the lower roll carries a cooperating recess 50, one wall of which serves as a shear plate. The shearing members travel at the same speed as the web and hence do not interfere with its smooth continuous movement.

Conventional supporting, driving, and control means are used to operate all parts of the apparatus in proper coordination and have not been illustrated since they are not necessary to an understanding of the invention.

When a sufficient number of sheets have been severed by the shear rolls 44, 46 they are stacked up on each other so that the dimples nest with each other as shown in section in FIG. 3. Whether the cement is wet or dry the dimples serve in the same way as guide pins and holes to prevent any lateral relative movement between the sheets while they are being bonded and hence the grid patterns will be retained in accurate depthwise alignment as indicated.

The laminate 52 which will become a finished filter body is now transferred to the press 54, FIG. 6, for bonding. The press includes a platform 56 on which is mounted a base plate 58. Guide pins 60 extend through the base plate into the platform and extend upwardly in parallel spaced relation. Pressure plate 62 is carried by piston rod 64 which is actuated by a conventional ram, not shown, to move the pressure plate toward and away from the base plate. The pressure plate is provided with guide apertures 66 slidably fitting guide pins 60 to maintain the pressure plate in exact alignment with the base plate at all times.

Base plate 58 is provided with a plurality of protuberances 68 which are located to align exactly with the dimples in the laminate 52, and pressure plate 62 is provided with matching recesses 70. The laminate is laid on the base plate with dimples 20 engaging protuberances 68. The pressure plate is now lowered by the ram until the recesses 70 seat on dimples 20. Plate 62 is pressed firmly against the laminate and the sheets are squeezed tightly together. All air is expelled from between them and any excess cement is also squeezed out. If protuberances 68 were guide pins and dimples 20 were guide apertures the excess cement could work its way down the pins and some of it would work in between the laminate and the base plate so that it would be difficult to separate them later. However the dimples present no opening whatsoever and this difficulty is completely avoided.

Once the sheets are squeezed tightly together there is practically no tendency to separate vertically or depthwise. However, in the absence of restraint, they can move relatively laterally, and such movement of only one ten-thousandth inch or so is enough to seriously affect the registry of the grid patterns. Earlier practice was to use a separate base board mounted on a fixed base plate like member 58 and provided with a plurality of guide pins projecting upwardly. The laminate was provided with matching holes which were fitted on to the pins. After a pressure application with dwell, the board and laminate were removed together and set aside for the cement to dry or cure. Another base board was placed in the press and the same procedure followed. Since the drying time is fairly long, this procedure requires a large number of base boards.

However, with the procedure of this invention the laminate can be removed immediately and set aside for the cement to dry with no removal of the base plate.

The interengaging dimples prevent any lateral slippage of the sheets and the cement sets up with the grid patterns in perfect registry. It can be seen that this speeds up production and greatly reduces the amount of equipment needed. After the cement has set, the marginal portions of the laminate containing the dimples are severed, and the remaining portion constitutes the completed filter body. Of course this rectangular blank can later be trimmed to any desired shape for application to an instrument, television set, or the like.

When a diamond grid or other pattern with crossing lines is imprinted it is, of course, necessary to locate each dimple longitudinally with respect to a given number of closed figures so that when the sheets are stacked the grid lines will be in proper register longitudinally as well as laterally.

In some installations it is desirable that the axes of the viewing cells of the ambient light trapping filter extend at an angle other than normal to the plane of the filter body. In television sets, considering the filter as extending in a generally vertical plane, it may be desired to have the viewing axes angled upwardly, and with radar scopes in airplanes it may be desired to have the viewing axes angled laterally. In the present invention this can be accomplished by appropriately shaping the dimples.

As will be seen by reference to FIG. 4, the dimples still preferably take the form of cones, but the axes of the cones are tilted or angled in the desired direction. For instance, the left side of dimple 72 in sheet 74, as viewed in this figure, approaches vertical while the right side has an increased angle from the vertical. That is, the center line or axis 76 is tilted. Because of this shape or arrangement, when the sheets 74 are stacked as indicated in FIG. 5 each succeeding sheet is slightly displaced with respect to the preceding sheet and the viewing axes defined by grid lines 78 are sloped upward to the left as viewed in this figure.

Where a higher rate of production is desired the apparatus of FIG. 7 is adopted. The main portion of the apparatus consists of a duplication of that shown in FIG. 1, each section preparing a web for subsequent shearing and lamination. The number of sections can be made as great as the number of sheets to be laminated into a single filter body.

After leaving rolls 21 the webs 10 are changed in direction by guide rollers 80 so that they approach the laminating and severing station in a substantially common horizontal plane, the longitudinal position of the webs being adjusted so that the dimples of one web will nest with the dimples of the adjacent web. They then proceed forwardly and enter between a pair of pressure rolls 82 and 84 which are provided with protuberances 86 and recesses 88 to properly engage dimples 20 and maintain the grid patterns in registry while the webs are bonded together. The upper side of the upper web is, of course, coated with cement. Therefore, an additional web 90, free of cement, is introduced from the left as viewed in FIG. 7, passes around roll 82, and becomes the uppermost lamina in the assembly. The pressure between the rolls is great enough to squeeze out any entrapped air and excess cement and the bonding is now completed except for final setting of the cement. If the heat softening cement is used, then rolls 82 and 84 are heated in conventional fashion to soften the cement for bonding purposes.

A shearing device is schematically shown at 92, 94. The webs remain integral until they pass through the pressure rolls, and the shearing device can be located at any reasonable distance onwardly therefrom to allow time for the cement to set.

It will be apparent to those skilled in the art that various changes can be made in the construction and arrangements of parts and sequence of steps without departing from the spirit of the invention and it is intended that all such changes and modifications shall be embraced within the scope of the following claims.

I claim:

1. Apparatus for producing filter elements for a space-lattice type ambient light trapping filter, comprising: a pair of drive rolls adapted to engage between them and drive forwardly a continuous flexible web of transparent plastic material; each drive roll having adjacent its ends an annular forming portion; the forming portions of one roll being provided with uniformly peripherally spaced protuberances and the forming portions of the other roll being provided with uniformly peripherally spaced recesses; said protuberances and recesses engaging marginal portions of the web to deform its material into the recesses to form a series of uniformly spaced dimples along each margin; and a second pair of rolls spaced onwardly from said first pair and provided with protuberances and recesses to engage the dimples in said web and drive it onwardly; said web passing around one roll of said second pair through a substantial arc of travel; the other roll of said second pair being provided with printing formations coated with printing fluid to engage the exposed face of said web and imprint a grid pattern thereon.

2. Apparatus as claimed in claim 1; the forming portions of said first pair of drive rolls being heated to soften the margins of said web and facilitate the formation of said dimples.

3. Apparatus as claimed in claim 1; the printing roll of said second pair being heated to promote rapid drying of the printing fluid.

4. Apparatus as claimed in claim 1; the second roll of said second pair being coated with heat softening cement for transfer to the face of the web opposite the printed face.

5. Apparatus as claimed in claim 1; and, in addition thereto, shear means located onwardly beyond said second pair of rolls for dividing the web into segments for lamination into light trapping filters.

6. Apparatus for producing filter elements for a space-lattice type ambient light trapping filter, comprising: a pair of drive rolls adapted to engage between them and drive onwardly a continuous flexible web of transparent plastic material; each drive roll having adjacent its ends an annular forming portion; the forming portions of one roll being provided with uniformly peripherally spaced protuberances and the forming portions of the other roll being provided with uniformly peripherally spaced recesses; said protuberances and recesses engaging marginal portions of the web to deform its material into the recesses to form a series of uniformly spaced dimples along each margin; said web passing around a first one of said rolls through a substantial arc of travel; the second one of said rolls being provided with printing formations coated with printing fluid to engage the exposed face of said web in substantially line contact transversely of the direction of travel and imprint a grid pattern thereon.

7. Apparatus as claimed in claim 6; the forming portions of said drive rolls being heated to soften the margins of said web and facilitate the formation of said dimples.

8. Apparatus as claimed in claim 6; asid second roll being heated to promote rapid drying of the printing fluid.

9. Apparatus as claimed in claim 6; said first roll being coated with heat softening cement for transfer to the face of the web opposite the printed face.

10. Apparatus as claimed in claim 6; and, in addition thereto, shear means located onwardly beyond said rolls for dividing the web into segments for lamination into light trapping filters.

11. A method of producing space-lattice type ambient light trapping filters, comprising: supplying a continuous web of transparent plastic material; translating said web longitudinally; producing a series of uniformly spaced dimples along at least one margin of said web; imprinting on one face of said web a continuous predetermined grid pattern; applying a coat of cement to the other face of said web; dividing the web into sheets of predetermined length; arranging a plurality of said sheets in laminar relation with said dimples in registry to produce a predetermined depthwise registry of the grid patterns; and applying depthwise directed pressure to the laminated sheets to unite them into completed ambient light trapping filters.

12. A method of producing a space-lattice type ambient light trapping filter, comprising: producing a plurality of sheets of transparent plastic material each having identical grid patterns imprinted on one face thereof and identical dimple patterns impressed therein and provided with a cement coating on the other face thereof; arranging said sheets in laminar relation with the dimples of each sheet nesting with the dimples of the adjacent sheet to align the grid patterns in predetermined depthwise registry; and applying depthwise directed pressure to the laminated sheets to unite them into a completed ambient light trapping filter.

13. Apparatus for producing a laminate of filter elements to constitute a space-lattice type ambient light trapping filter, comprising: means for longitudinally translating a continuous flexible web of transparent plastic material, including forming means for producing a series of uniformly spaced dimples along each margin of the web, means to print a continuous grid pattern on one face of the web, and means to apply heat softening cement to the other face of the web; at least a second translating means to translate a second similar web and apply a printed grid pattern and a coating of heat softening cement in substantially the same manner as the first mentioned translating means; further means to guide said webs into laminar engagement with each other and with the dimples of each web in registry to achieve a predetermined registry of the grid patterns in a depthwise direction; and means to apply an additional web to the laminate and to apply heat to the assembly to soften the cement and secure all of the webs together with the grid patterns fixed in depthwise spaced relation and in predetermined registry.

14. Apparatus for producing space-lattice type ambient light trapping filters, comprising: means for longitudinally translating a continuous web of transparent plastic material provided with a series of predeterminedly spaced dimples; means to imprint a continuous grid pattern on one face of said web in predetermined relation to the dimple pattern; means to apply cement to the other face of said web; means to sever said web into predetermined lengths; and means to apply depthwise pressure to laminations of said lengths stacked with said dimples in registry to unify said laminations into filters having depthwise spaced grid patterns in predetermined registry.

15. Apparatus for producing space-lattice type ambient light trapping filters, comprising: means for longitudinally translating a continuous web of transparent plastic material; means for deforming marginal portions of said web out of its plane at regular intervals to produce a series of uniformly spaced dimples; means to imprint a continuous grid pattern on one face of said web; means to apply cement to the other face of said web; means to shear said web into predetermined lengths; and means to apply depthwise pressure to laminations of said lengths stacked with said dimples in registry to unify said laminations into filters having depthwise spaced grid patterns in predetermined registry.

16. Apparatus for producing a filter element adapted to register substantially perfectly with like filter elements in laminar relation in the manufacture of space lattice type ambient light trapping filters, comprising: a backing member; a printing member having grid-printing means thereon; said members being adapted to receive between them a length of thin, flexible, transparent material to be processed; and index-forming means engageable with said length of material to produce a pattern of permanent index formations therein; said grid-printing means being engageable with said length of material to produce thereon a representation of a suitable grid pattern; the pattern of said grid-printing means being always in identical registry relation with the index-forming means and the latter being in engagement with the material during the printing phase; whereby the grid pattern on each filter element will be in exactly the same registry relation with its respective index formations to facilitate exact registry of the grid patterns during lamination.

17. Apparatus as claimed in claim 16; in which said index-forming means comprise protuberances carried by one of said members and cooperating recesses carried by the other of said members.

18. A method of producing a filter element adapted to register substantially perfectly with like filter elements in laminar relation in the manufacture of space lattice type ambient light trapping filters, comprising the steps of: gripping a length of thin, flexible, transparent material and producing a pattern of permanent index formations therein; printing a desired grid pattern on said material in exact predetermined registry relation with the index formations; and insuring said registry relation by restraining said material against any relative shifting between said index formations and the grid pattern during the printing phase.

19. A method as claimed in claim 18; in which the production of index formations in said material and the printing of the grid pattern thereon take place substantially simultaneously.

20. A method of producing a space-lattice type filter, comprising: producing a plurality of sheets of transparent plastic material each bearing identical grid patterns and each having identical patterns of dimples impressed therein and in identical relation to the grid patterns; arranging said sheets in laminar relation with the dimples of each sheet nesting exactly with the dimples of the adjacent sheet to form the sole means of aligning the grid patterns in predetermined depthwise registry with cementitious material between adjacent sheets; and applying depthwise directed pressure to the laminated sheets to unite them into a completed ambient light trapping filter.

21. A method as claimed in claim 20; including forming said dimples with their axes at identical predetermined acute angles to the plane of the sheet to cause said grid patterns to be registered in laterally stepped relation depthwise of the completed filter.

References Cited by the Examiner

UNITED STATES PATENTS

| | | |
|---|---|---|
| 249,429 | 11/1881 | Walton. |
| 2,129,929 | 9/1938 | Gurwick _____ 161—36 |
| 2,444,394 | 6/1948 | Arnold _____ 264—135 |
| 2,518,164 | 8/1950 | Meyer _____ 156—513 |
| 2,655,978 | 10/1953 | Gonda et al. _____ 156—201 |
| 2,729,267 | 1/1956 | Walton _____ 161—126 X |
| 2,980,567 | 4/1961 | Steel _____ 161—36 |
| 3,242,024 | 3/1966 | Bova et al. _____ 156—197 |

ALEXANDER WYMAN, *Primary Examiner.*

JACOB STEINBERG, *Examiner.*